US008850308B1

(12) United States Patent
Roselander

(10) Patent No.: US 8,850,308 B1
(45) Date of Patent: Sep. 30, 2014

(54) AUTOMATED DETERMINATION OF WEBSITE STRUCTURE

(75) Inventor: Jason Roselander, Luxembourg (LU)

(73) Assignee: Amazon Technologies, Inc., Reno, NV (US)

( * ) Notice: Subject to any disclaimer, the term of this patent is extended or adjusted under 35 U.S.C. 154(b) by 490 days.

(21) Appl. No.: 13/046,596

(22) Filed: Mar. 11, 2011

(51) Int. Cl.
G06Q 10/00 (2012.01)
G06Q 10/06 (2012.01)

(52) U.S. Cl.
CPC .... *G06Q 10/06398* (2013.01); *G06Q 10/06395* (2013.01)
USPC ............ 715/239; 707/802; 705/7.38

(58) Field of Classification Search
CPC ............ G06Q 10/10; G06Q 10/06395; G06Q 10/06398
USPC ............ 715/239; 707/802; 705/7.38
See application file for complete search history.

(56) References Cited

U.S. PATENT DOCUMENTS

| 6,148,311 | A * | 11/2000 | Wishnie et al. | 715/205 |
| 7,356,559 | B1 * | 4/2008 | Jacobs et al. | 709/203 |
| 7,881,957 | B1 * | 2/2011 | Cohen et al. | 1/1 |
| 7,885,844 | B1 * | 2/2011 | Cohen et al. | 1/1 |
| 8,121,888 | B1 * | 2/2012 | Cohen et al. | 705/7.38 |
| 2001/0054049 | A1 * | 12/2001 | Maeda et al. | 707/517 |
| 2006/0031849 | A1 * | 2/2006 | Barta et al. | 719/320 |
| 2006/0041827 | A1 * | 2/2006 | Yamaoka et al. | 715/500 |
| 2006/0123337 | A1 * | 6/2006 | Koinuma | 715/530 |
| 2007/0016460 | A1 * | 1/2007 | Weiss | 705/8 |
| 2009/0288030 | A1 * | 11/2009 | Wahl et al. | 715/772 |
| 2010/0146413 | A1 * | 6/2010 | Yu | 715/760 |
| 2010/0235402 | A1 * | 9/2010 | Han et al. | 707/802 |
| 2010/0325530 | A1 * | 12/2010 | Murai | 715/234 |
| 2011/0071893 | A1 * | 3/2011 | Malhotra et al. | 705/14.23 |
| 2012/0110515 | A1 * | 5/2012 | Abramoff et al. | 715/854 |
| 2012/0123835 | A1 * | 5/2012 | Chu | 705/14.12 |

OTHER PUBLICATIONS

Geoffrin et al., "Monitoring and Enforcing Price Parity," U.S. Appl. No. 12/588,335, filed Oct. 13, 2009, 38 pages.
"FAQ—Firebug Wiki," retrieved Mar. 15, 2011, from http://getfirebug.com/wiki/index.php/FAQ, 11 pages.
"Firebug," retrieved Mar. 15, 2011, from http://getfirebug.com, 6 pages.

\* cited by examiner

*Primary Examiner* — Stephen Hong
*Assistant Examiner* — Marshon Robinson
(74) *Attorney, Agent, or Firm* — Seed IP Law Group PLLC

(57) ABSTRACT

Techniques are described for automatically determining the structure of multiple related Web pages based at least in part on human-supplied information, such as in at least some situations by automated operations of a website structure determination system to determine a common structure of at least some Web pages of a target Website of interest. In at least some such situations, the techniques include identifying structural elements or other structural locations within the common structure of multiple related Web pages that correspond to one or more types of information of interest. Once such structural locations are identified for one or more types of information of interest, information of those types may then be automatically retrieved from various Web pages of the target Website using those identified structural locations, even if those Web pages have not been previously manually reviewed.

26 Claims, 7 Drawing Sheets

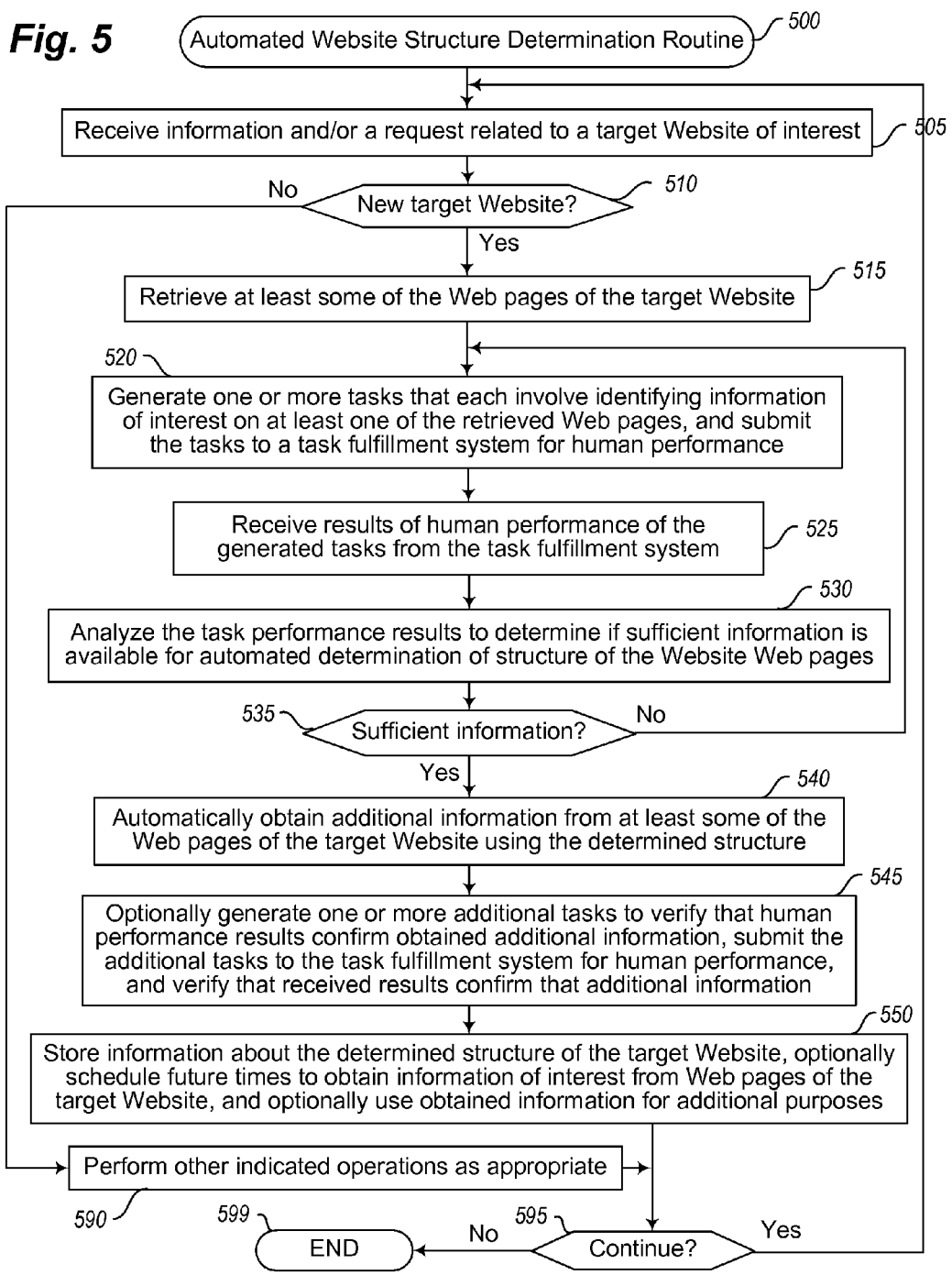

AUTOMATED DETERMINATION OF WEBSITE STRUCTURE

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

BRIEF DESCRIPTION OF THE DRAWINGS

FIG. 5 is a flow diagram of an example embodiment of an Automated Website Structure Determination routine.

DETAILED DESCRIPTION

Figure 1:
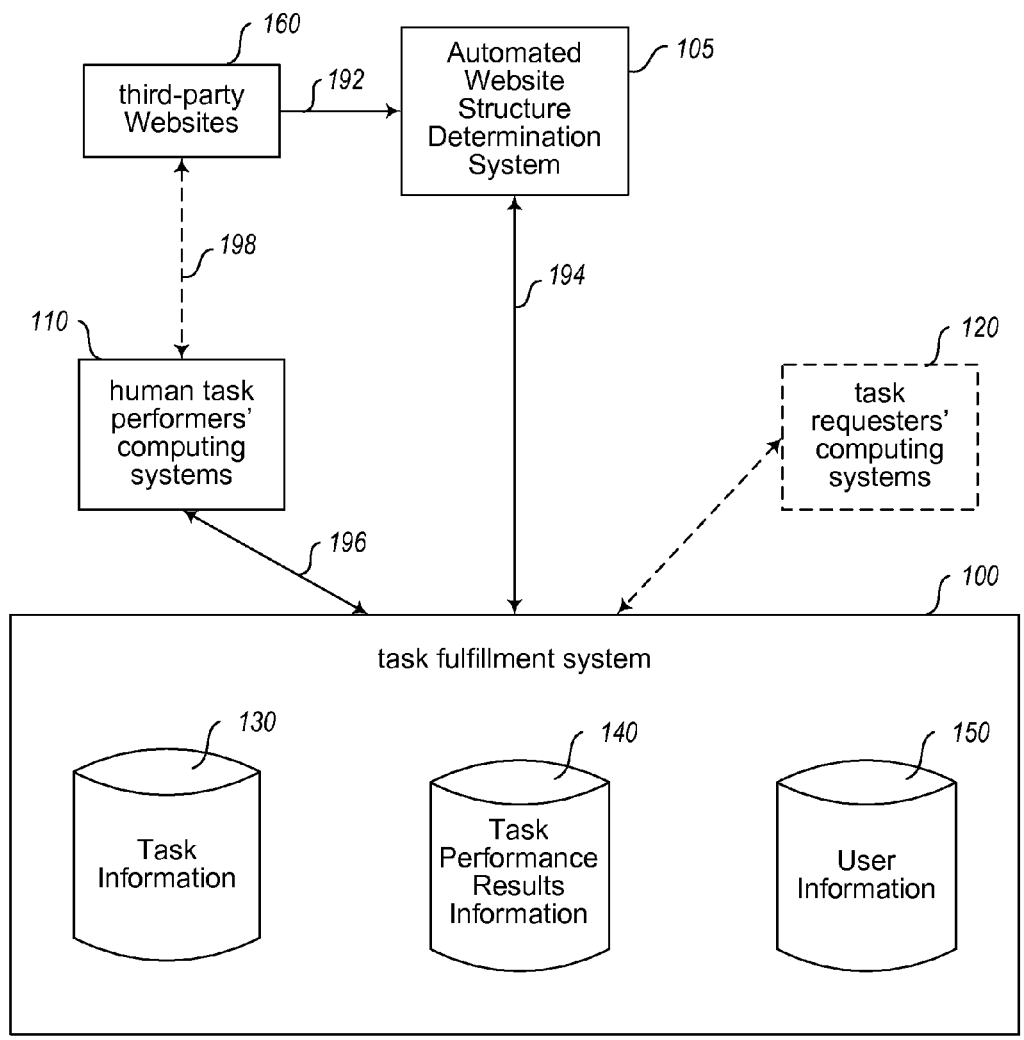
FIG. 1 is a block diagram illustrating an example embodiment of a system that facilitates automated determination of the structure of a Website of interest, such as based in part on related information supplied by human task performers.

Techniques are described for automatically determining the structure of multiple related Web pages based at least in part on human-supplied information, such as in at least some embodiments by automated operations of a website structure determination system, as discussed in greater detail below. In at least some such embodiments, multiple Web pages of a particular target Website share a common structure, and the techniques include identifying structural elements or other structural locations within the common structure that correspond to one or more types of information of interest. Once such structural locations are identified for one or more types of information of interest, information of those types may then be automatically retrieved from various Web pages of the target Website using those identified structural locations, even if those Web pages have not been previously manually reviewed, such as to retrieve information from a Web page a single time so that the retrieved information may be used in one or more manners, to retrieve information periodically or otherwise repeatedly from a particular Web page if that information can change (e.g., to track any such changes), etc.

In at least some embodiments and situations, the identification of one or more locations in the structure of one or more Web pages that correspond to one or more types of information of interest is based at least in part on human-supplied information. For example, the visual representation of a displayed Web page may be provided to one or more humans, along with a request to specify or identify one or more types of information of interest in the visual representation in one or more manners. Once such identified information is received from the human(s), that identified information may be used to analyze an underlying textual document that represents the displayed Web page, such as to map the identified information from the human(s) to particular structural locations within the underlying textual document, such as to identify particular structural elements of the underlying textual document that store or otherwise represent the identified information supplied by the human(s). In this manner, the automated analysis of the underlying textual document may identify particular structural locations of the one or more types of information of interest, thus enabling information of those same types to be automatically retrieved from other Web pages that share common structural elements with the displayed Web page.

As one illustrative example, the target Website may correspond to an online retailer that offers numerous products of one or more categories, with each product having a distinct Web page at the target Website that includes detailed information about that product. Some or all of the products may further share one or more common attributes of interest, and information about those particular attributes may be stored in the same locations within their respective Web pages—such attributes of interest may include, for example, one or more of weight, size, color, current availability, price, product category, corresponding image, textual description, etc. A textual document representing the Web page for one of those products may then be retrieved, such as a document formatted using HTML ("HyperText Markup Language"), XHTML ("eXtensible HTML"), XML ("Extensible Markup Language"), etc. A visual representation of the textual document may then be generated (e.g., by rendering or otherwise displaying the textual document within a Web browser or other application), and a human may be asked to identify a particular type of information of interest in that visual representation, such as the value of a particular attribute of interest. For example, if the attribute of interest is weight of the product, the human may be asked to enter into a user-editable text box the numeric weight value of the product that is shown in the visual representation of the displayed Web page, or may instead identify the weight attribute's value in the visual representation in other manners, as discussed below. Once the weight attribute's value is available to an embodiment of the automated website structure determination system, the corresponding structure within the Web page's underlying representation that corresponds to that value may be automatically identified in various manners by the automated website structure determination system, such as by searching the original textual document representing the Web page or a related structural representation of the Web page for the weight attribute's value and identifying the structure encompassing it—the related structural representation of the Web page may, for example, be a DOM ("Document Object Model") that represents objects corresponding to particular aspects within the original textual document for the Web page, or may instead have other formats. After the structural location for a product's weight attribute is identified in one or more products' Web pages of the target Website, the weight value for some or all of the other products available from the target Website may be automatically retrieved by the automated website structure determination system embodiment by automatically extracting that information from the Web pages of those products based on using that structural location. Alternatively, if the attribute of interest was a value that may change over time, such as an indication of whether or not a product is currently available (e.g., currently in stock), the Web page for a particular product may be repeatedly retrieved and analyzed in order to track the changing current availability of that particular product over time.

As another illustrative example, the target Website may be an online dictionary that provides definitions for numerous words, with each word having a distinct Web page (e.g., a Web page dynamically generated from an underlying database) that includes various information about that word. The Web page for each word may include various common attributes, such as a pronunciation guide, one or more types of speech, one or more synonyms, one or more alternative spellings, a historical origin, etc. In a similar manner to that described for the online retailer example, one or more humans may supply information about the particular values of an attribute of interest for one or more particular words, and that information may be used by an embodiment of the automated website structure determination system to determine a corresponding structural location for that attribute of interest in the target Website's Web pages, thus enabling information about that attribute to be automatically retrieved for other words of interest that were not manually reviewed by one or more humans. It will be appreciated that similar techniques may be applied to a wide variety of types of Websites, Web pages and attributes of interest.

As previously noted, various types of textual documents or other structural representations may be used to represent the structure of a Web page, including a DOM representation in at least some embodiments. Furthermore, the structure of a Web page may include a variety of types of structural elements. For example, a non-exclusive list of some types of structural elements that may be part of at least some types of Web pages includes the following: an anchor, a button, a canvas, a div element, a form, a frame, a heading, an image, various types of input elements, a label, a link, a list, a paragraph, a script, a span element, a table, a title, etc. As will be understand, many elements may hierarchically include other elements and/or be included in other elements, such as a table element being composed of various columns, rows and cells, a form element including text and user-selectable input controls, an HTML element for a Web page containing all other elements of the Web page, etc. In addition, a structural representation of a Web page may be accessed and/or analyzed in various manners in various embodiments, including using APIs ("application programming interfaces") specific to particular representations (e.g., JavaScript and other DOM scripting for DOM representations), as well as tools such as XPath ("XML Path Language"), XQuery, XSLT ("eXtensible Stylesheet Language Transformations"), etc.

In addition, various types of information may be gathered from humans in various manners from the visual representation of a displayed Web page, and may be used as part of the analysis of the structural representation of the Web page in various manners. For example, as previously noted, a user may be asked in some embodiments and situations to type or otherwise enter a textual representation of particular information of interest that is shown in a visual representation, and a textual document or other structural representation of the Web page may then be searched for corresponding text. In some embodiments and situations, if the human is viewing the visual representation as an image, the human may click on or otherwise select one or more points that represent the location of the particular information of interest, and corresponding information may be extracted from the image (e.g., by using optical character recognition on the selected area; by maintaining a mapping of information included in the visual representation to corresponding locations in the image, such as if the image is generated from a textual representation of the Web page; etc.). In addition, in at least some embodiments, some additional text or other information near the particular information of interest may also be specified by the human and similarly used to identify the corresponding particular information of the interest in the structural representation of the Web page, such as to use text surrounding an attribute value in the visual representation to disambiguate multiple occurrences of that attribute value in the structural representation. Such additional text or other information could, for example, also be textually entered by the human, or instead could be specified in other manners (e.g., by dragging or otherwise placing a box or other shape around the displayed particular information of interest and optionally around additional surrounding text or other displayed information, such as if the visual representation is presented as an image and if image selection or editing tools are available to the human, and with optical character recognition optionally used to extract particular text from the user-selected area). Alternatively, if the human is viewing the visual representation as a rendered Web page rather than an image and if the particular information of interest is a user-selectable link or other control, the human may specify that particular information by selecting it (e.g., clicking on it), if information about the selected element is available to the automated website structure determination system or other system with which the human is interacting—in such situations, the corresponding structural element to the displayed element selected by the user may be directly detectable (e.g., in a manner analogous to a visual debugger), and/or the displayed element selected by the human may be used as part of the analysis of the structural representation in one or more of the manners discussed above. Accordingly, information may be gathered from humans in various manners in various embodiments from the visual representation of a displayed Web page, as discussed in further detail below with respect to FIG. 2B and elsewhere.

Furthermore, information may be obtained from humans in various manners in various embodiments. For example, in order to gather information from one or more humans about an indicated type of information of interest in one or more Web pages, a group of one or more related tasks may be created in some embodiments that each include a request to review one or more displayed Web page visual representations to identify one or more indicated types of information of interest, and those multiple tasks may then be made available to one or more human users for performance. After the results are received from the human performance of the tasks, that human-supplied information may then be used in various manners, as discussed in greater detail elsewhere.

To facilitate the performance of such tasks (also referred to herein as "Web page information identification tasks"), the automated website structure determination system may in some embodiments interact with one or more external task fulfillment systems via which the tasks are performed, while in other embodiments the automated website structure determination system may instead directly interact with one or more human users to effect the performance of Web page information identification tasks (e.g., if the automated website structure determination system is integrated with or otherwise associated with a task fulfillment system). Such a task fulfillment system may, for example, facilitate interactions between task requesters who have tasks available to be performed and task performer users who are available to perform tasks, such as interactions that involve human task performer users performing tasks supplied by task requesters. In at least some embodiments, at least some of the tasks to be performed via such a task fulfillment system are human performance tasks that use cognitive and other mental skills of human task performer users, such as to employ judgment, perception and/or reasoning skills of the human task performer users. Furthermore, in at least some embodiments, at least some tasks may be fee-based tasks that each have an associated fee to be paid to one or more task performer users for successful performance of the task, and at least some tasks may further have various restrictions and other criteria associated with performance of the task (e.g., preferred or required qualifications of human task performer users who perform the task)— in such embodiments, the automated website structure determination system may pay fees for performance of submitted Web page information identification tasks and/or specify various criteria related to performance of submitted Web page information identification tasks.

Thus, in at least some embodiments, an electronic task fulfillment system acts as an intermediary to allow task requesters and task performer users to interact, and facilitates the performance of Web page information identification tasks by human task performer users. In particular, in some embodiments, one or more computing systems providing the task fulfillment system act as an intermediary to allow task requesters to programmatically request (e.g., via programmatic invocations of one or more APIs of the task fulfillment system by application programs of the task requesters) that tasks be performed by human task performers and to receive corresponding results after the tasks are performed (e.g., as responses to the programmatic invocations), thus providing a form of artificial artificial intelligence to task requesters' application programs. Similarly, human task performer users may access the task fulfillment system (e.g., in a programmatic or interactive manner) to obtain information about available tasks that they may perform and to provide the results of task performance after the completion of tasks that they are assigned. By enabling large numbers of unaffiliated or otherwise unrelated task requesters and task performers to interact via the intermediary task fulfillment system in this manner, free-market mechanisms mediated by the Internet or other public computer networks may be used to programmatically harness the collective intelligence of a mutable ensemble of unrelated human task performers. Additional details related to the function and operation of various embodiments of task fulfillment systems, such as a task fulfillment facilitator system embodiment, are included in pending commonly-owned U.S. patent application Ser. No. 10/990,949, filed Nov. 16, 2004 and entitled "Providing an Electronic Marketplace to Facilitate Human Performance of Programmatically Submitted Tasks;" which is hereby incorporated by reference in its entirety.

FIG. 1 is a block diagram illustrating an example of an automated website structure determination system, as well as users interacting with a remote task fulfillment system to supply and perform tasks. An embodiment of the automated website structure determination system uses various of the described techniques for automatically facilitating performance of Web page information identification tasks by human users via the task fulfillment system, as well as to perform additional activities in automatically determining the structure of particular target Websites of interest based on the results of human performance of those tasks. In particular, in this example, a task fulfillment system 100 embodiment provides functionality related to human performance of tasks, such as by managing data related to tasks and to users who supply and/or perform the tasks, and an Automated Website Structure Determination System 105 embodiment automatically determines the structure of particular target Websites of interest. For illustrative purposes, some embodiments are described herein in which specific types of users and systems interact in specific ways, and in which the systems store specific types of data and provide specific types of related functionality. For example, in the illustrated embodiment, the Automated Website Structure Determination System 105 is distinct from the task fulfillment system 100 (e.g., is unaffiliated with the task fulfillment system, other than as a task requester that submits task to the task fulfillment system for performance) and programmatically interacts with the task fulfillment system to coordinate the performance of Web page information identification tasks, although in other embodiments a single system may perform some or all such techniques (e.g., an automated website structure determination system that directly provides tasks to humans for performance, a task fulfillment system that also generates Web page information identification tasks and analyzes the results of the corresponding human-supplied information, etc.), or instead a single automated website structure determination system may interact with multiple task fulfillment systems and/or a single task fulfillment system may interact with multiple automated website structure determination systems. These examples are provided for illustrative purposes and are simplified for the sake of brevity, and the techniques disclosed herein can be used in a wide variety of other situations, some of which are described herein.

The task fulfillment system 100 may be implemented in various ways in various embodiments, such as in the form of a software system executing on one or more programmed or otherwise configured computing systems or devices (e.g., in a distributed manner, such as on a peer-to-peer or grid network), although such computing systems or devices are not shown in this example. Furthermore, while not illustrated in this example, data may be stored across multiple alternative storage partitions on multiple alternative computing nodes in some embodiments. In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the task fulfillment system 100 may facilitate the submission and performance of such human performance tasks, including Web page information identification tasks submitted by the automated website structure determination system 105. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking. In addition, related tasks may in some embodiments be grouped together or otherwise handled in a consistent manner, such as a group of multiple Web page information identification tasks that are part of analyzing a single target Website.

In the example of FIG. 1, the task fulfillment system 100 includes a task information data repository 130, task performance results information data repository 140, and a user information data repository 150. In this example, various task requesters may supply information about tasks that are available to be performed by task performer users 110, including one or more optional task requesters 120 whose computing systems may interact with one or more computing systems of the task fulfillment system 100 to submit tasks that are not related to automated Website structure determination efforts.

The Automated Website Structure Determination System 105 may also supply Web page information identification tasks and/or other tasks to the task fulfillment system 100, and may also be implemented in various ways in various embodiments, such as in the form of a software system executing on one or more programmed or otherwise configured computing systems or devices (not shown). In particular, in this example, the Automated Website Structure Determination System 105 receives information about one or more third-party target Websites 160 of interest (e.g., from a human operator of the system 105, not shown), and optionally performs automated programmatic interactions 192 over one or more intervening networks (not shown) with computing systems (not shown) that serve those target Websites in order to obtain one or more Web pages for each of those target Websites. The Automated Website Structure Determination System 105 in this example then performs automated programmatic interactions 194 over one or more intervening networks (not shown) with the programmed computing systems that provide the task fulfillment system 100 in order to submit one or more Web page information identification tasks for each of the target Websites. As previously noted, the Web page information identification tasks may display information to and gather information from human users in various manners. For example, if the system 105 has retrieved one or more Web pages from a target Website, a submitted task may include a visual representation of one of those Web pages, such as in the form of an image or in the form of an underlying textual representation that causes the visual representation to be generated when the task is displayed to a human user (e.g., by including the textual representation as part of a Web page to be rendered for display to the human user for the task, such as in a frame or other portion of the displayed information). Alternatively, in some embodiments, the system 105 could include a URL ("Uniform Resource Locator") or other reference to a Web page of the target Website in the submitted task, such that the referenced Web page is retrieved 198 from the target Website when the task is displayed to a human user, and optionally without the system 105 having previously downloaded that Web page. Various of the human task performer users 110 may interact 196 with the task fulfillment system 100 to obtain tasks (including Web page information identification tasks) and to, after performing the tasks, supply task performance results to the task fulfillment system 100. After Web page information identification tasks are completed, the results of the task performance are supplied 194 to the Automated Website Structure Determination System 105 (whether as requested by the system 105 to pull those results from the system 100 and/or as proactively sent by the system 100 to push those results to the system 105). The Automated Website Structure Determination System 105 may then perform additional activities in automatically determining the structure of the one or more target Websites, including to optionally retrieve additional information from the target Website(s) (e.g., via one or more additional interactions 192) by using automatically determined structural location information.

As previously noted, various task requesters 120 other than the Automated Website Structure Determination System 105 may optionally interact with the task fulfillment system 100 in order to supply various types of tasks that are available to be performed by task performer users 110, as well as to perform other related activities, although in some embodiments only Web page information identification tasks may be allowed if the task fulfillment system 100 is acting as a dedicated part of the Automated Website Structure Determination System 105. In the illustrated example, in addition to supplying tasks, a task requester 120 may interact with the task fulfillment system 100 to obtain results from the performance by one or more task performer users 110 of previously supplied tasks, to obtain information about an account of the task requester (e.g., information about financial payments made to other users for performing fee-based tasks supplied by the task requester, information about previously specified preferences, etc.), to search for information about tasks and/or about task performer users who are available to perform tasks, to specify types of qualifications that task performer users may need to perform supplied tasks, etc. The task requesters 120 may take various forms, such as a user who interactively accesses the system 100 (e.g., via a GUI, or graphical user interface, displayed on a computing system of the task requester user, not shown, such as a GUI based on Web pages provided by the system 100 and/or based on execution of a client-side application on the computing system), or a software application that is programmatically interacting with the system 100 (e.g., via an API of the system 100, not shown) on behalf of a related task requester user or other entity. The Automated Website Structure Determination System 105 may also optionally perform some or all such activities in its role as a task requester interacting with the task fulfillment system 100.

When a task requester supplies information about one or more tasks (e.g., when the Automated Website Structure Determination System 105 supplies Web page information identification tasks), the task fulfillment system 100 stores the task-related data in the task information data repository 130, which may then be made available to task performer users 110 to perform those tasks in a manner specified by the task requester, or as otherwise determined by the task fulfillment system 100. The supplied information for a task may include a variety of types of information, including one or more pieces of data to be reviewed (e.g., one or more Web pages or portions thereof), other details related to the task (e.g., other types of information to be analyzed, a question to be answered, etc.), one or more qualifications of any task performer user who performs the task, one or more geographical locations associated with the task, one or more capabilities and/or other current characteristics of one or more devices to be used as part of performing the task, one or more criteria related to task performance (e.g., deadlines for completion, format of results from task performance, etc.), one or more associated rewards (e.g., monetary payments) to be provided to one or more task performer users who successfully perform the task, etc.

The task fulfillment system 100 also provides various functionality related to the performance of tasks by task performer users 110. For example, when a task performer user requests information about available tasks (e.g., as part of a search or browse request), the task fulfillment system 100 provides task-related data obtained from the task information data repository 130. In addition, when a task performer user requests to perform (or is assigned for performance) a particular task, the task fulfillment system 100 stores a temporary association between the task performer user and the task (e.g., in the task performance results information data repository 140). Then, when the task performer user has completed performance of the task, such as by providing task results for the performed task to the task fulfillment system 100, the task fulfillment system 100 stores the task results in the task performance results information data repository 140. The task fulfillment system 100 may also perform other related functions, such as notifying a task requester of the task results and/or completion of the performed task, facilitating a reward for performing the task (e.g., by crediting an account associated with the task performer or initiating a funds transfer to provide a monetary payment for a fee-based task), etc.

The task fulfillment system 100 also provides various functionality related to the management of various users, such as users associated with task requesters (including the Automated Website Structure Determination System 105) and task performer users 110. For example, such users may register with the task fulfillment system 100 by providing identifying information (e.g., name, address, telephone number(s), email addresses, etc.), possibly accompanied by various user preference information and/or payment information that may be used to facilitate payments between task requesters and task performer users for the performance of tasks. Such user-related information may be stored by the task fulfillment system 100 in the user information data repository 150, and the task fulfillment system 100 may further in some embodiments store various user-related information in the repository 150 (e.g., information about previously interactions between the system and the user, such as to reflect aggregate information about previous task performance for task performer users). In addition, task performer users 110 may also in at least some embodiments obtain qualifications that may be utilized for purposes of matching task performer users with appropriate tasks, with such qualification information also being stored in the user information data repository 150.

Figure 2A:
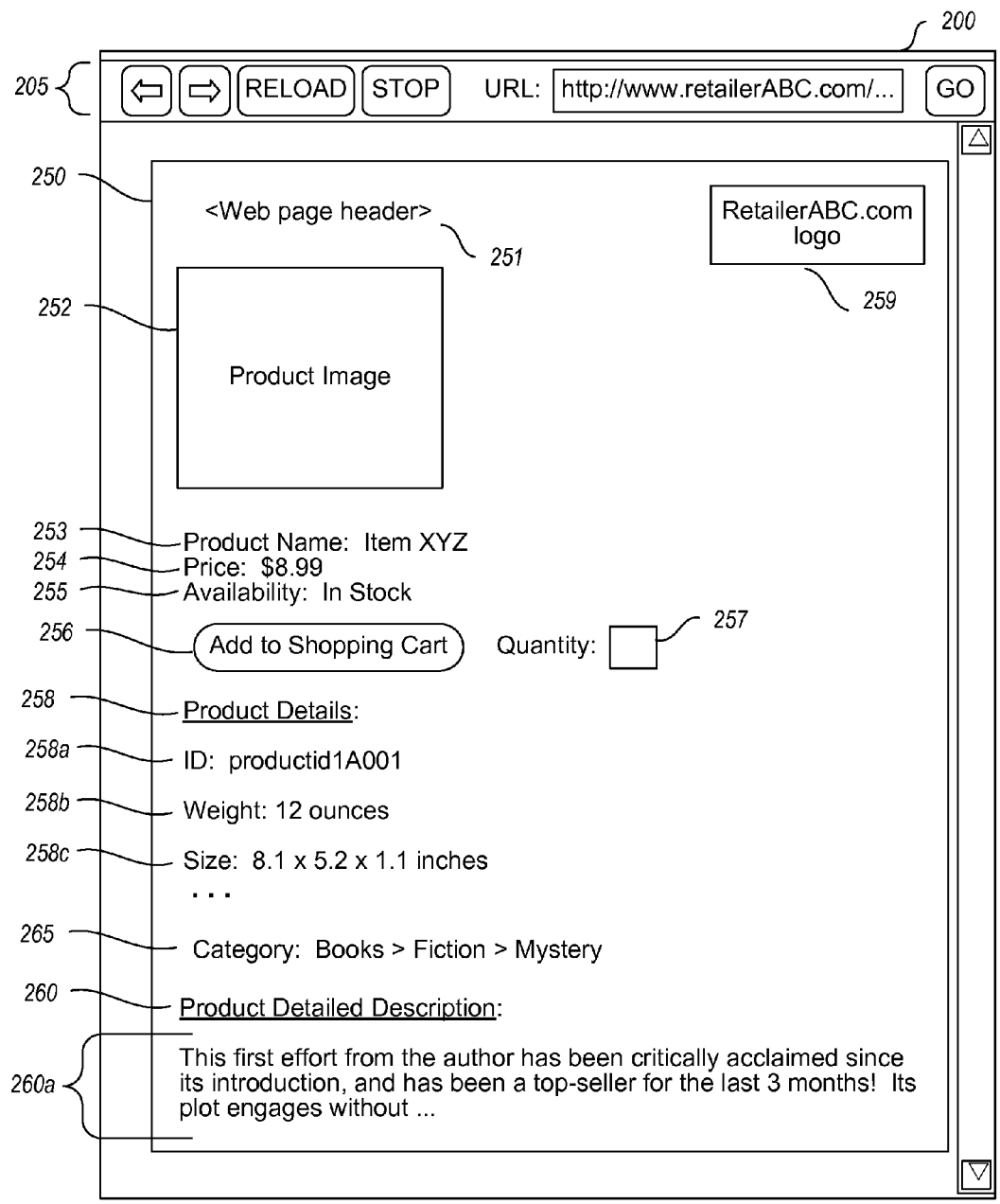
FIGS. 2A-2B illustrate examples of information of interest for automated determination of the structure of a Website.
Figure 2B:
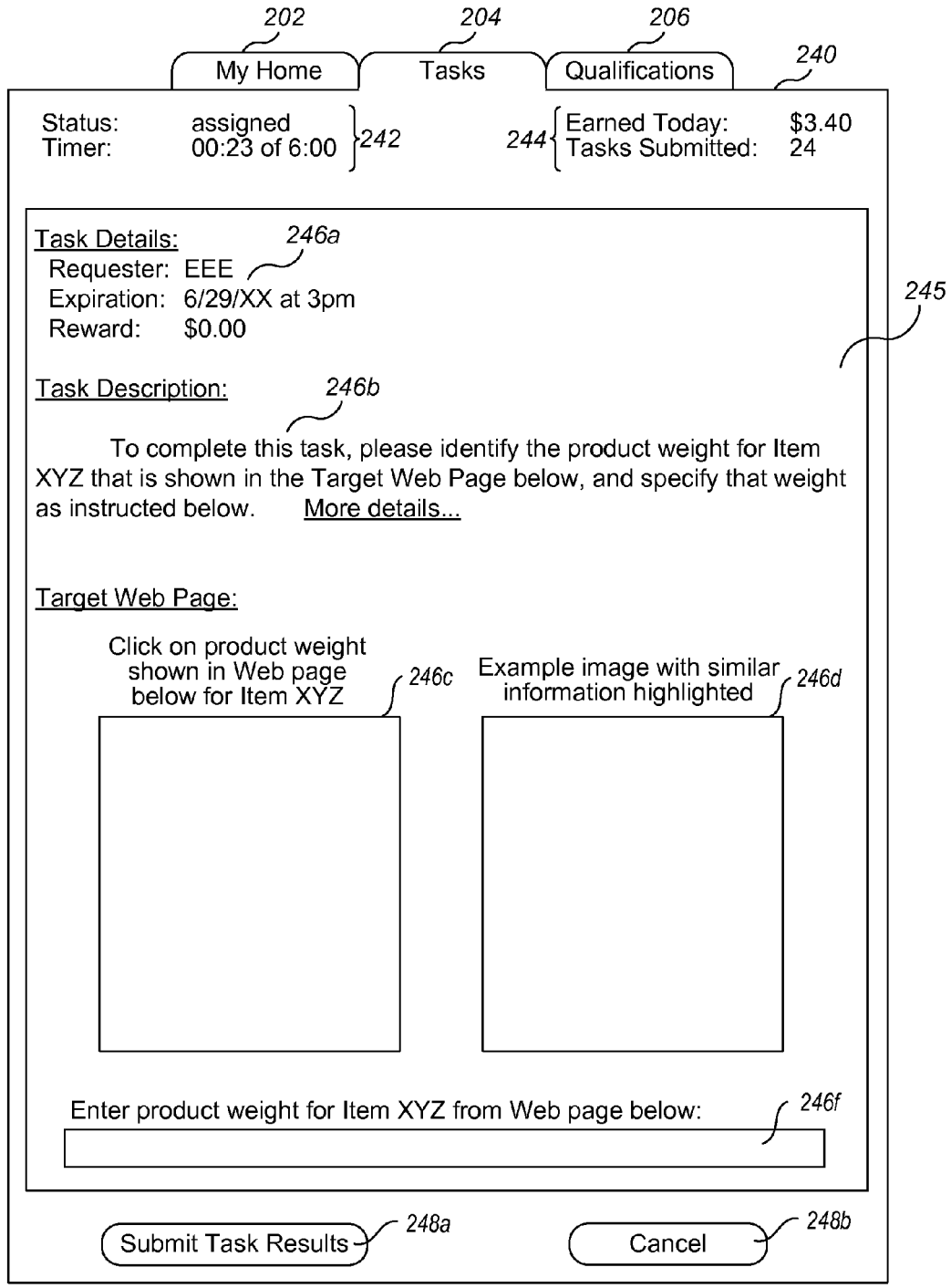

FIGS. 2A-2B illustrate examples of using Web page information identification tasks to obtain information from human task performer users regarding target Websites of interest. In particular, FIG. 2A illustrates an example Web browser program user interface 200, which in this example is displaying a visual representation 250 of a Web page obtained from a target Website of interest. In this example, the target Website is that of an online merchant RetailerABC.com, and the Web page includes information about a specific product Item XYZ that is available to be acquired by customers of the online merchant, including various information related to various aspects of the product. The attributes of the product in this example include a product image 252, a product name 253, a product price 254, product availability information 255, various other product details 258 (e.g., a unique product identifier 258a, product weight information 258b, product size information 258c, etc.), a product category 265, and a textual product description 260 with text 260a. In addition, the displayed Web page includes other information, such as user-selectable controls available for a user to initiate a purchase of the product (e.g. an "Add to Shopping Cart" button 256 that allows a user to add the product to an electronic shopping cart, and an editable textbox 257 that allows a user to specify a particular quantity of the product to add to the electronic shopping cart), a Web page header 251, a logo 259 of the online merchant, etc. It will be appreciated that other Web pages related to other subject areas may be displayed in Web browser user interface 200 and may have other types of subject area aspects, and that information may be organized and displayed in other manners in other embodiments. The illustrated Web browser user interface 200 also includes various user-selectable controls 205, such as, for example, forward and back arrow buttons to navigate a browse history, a RELOAD button to refresh the displayed visual representation of a loaded Web page by retrieving a new copy of the Web copy from its source (e.g., a remote Web site), a STOP button to interrupt loading and display of a Web page, an editable URL textbox for use in indicating an address of a Web page to be loaded, and a GO button to retrieve a Web page from an address indicated in the URL textbox. In other embodiments, other user-selectable controls may be available as part of the user interface of the Web browser, such as from one or more drop-down menus (not shown).

In the example of FIG. 2A, various of the information displayed in the visual representation 250 may correspond to information that is of a type of interest in a particular situation, and which each has a corresponding structural element in an underlying representation (not shown) of the Web page. For example, the value for any of the attributes 252-255, 258a-258c, 265 and 260 of the product may represent a type of information of interest for an embodiment of the automated website structure determination system, such that the automated website structure determination system may generate one or more Web page information identification tasks to obtain human-supplied information corresponding to the value of one or more of those attributes, and may subsequently used the corresponding obtained human-supplied information to automatically identify corresponding structural elements in an underlying textual representation of the Web page.

FIG. 2B illustrates an example user interface 240 that may be presented to a user performing a Web page information identification task, such as to obtain human-supplied information corresponding to the value of one or more of the attributes illustrated in the visual representation 250 of the displayed Web page of FIG. 2A. The example user interface 240 of FIG. 2B may, for example, be part of one or more Web pages provided by a task fulfillment system to a particular human task performer user, and in this example includes information that describes a Web page information identification task available for performance. Such a display may be presented to the user, for example, after the user has browsed or searched for available tasks and selected a particular Web page information identification task. In this example, the user interface 240 includes a status section 242 that provides information about the status of the task (which in this example is assigned to the current task performer user for performance) and about the time remaining for the user to perform the task. In addition, the example user interface further includes a user information section 244 that provides information regarding the total amount of tasks performed and money earned by the user on the current day. This example also includes several user-selectable navigation tab controls 202, 204, and 206, such as to enable the user to access various types of functionality available from the task fulfillment system.

The example user interface 240 also includes a task section 245 that provides various details about the available Web page information identification task to be performed, including task details 246a (e.g., task requester information, associated reward for performance, task expiration date, etc.) and a task description 246b that includes instructions specific to performing the illustrated Web page information identification task. In this example, the task section 245 further includes a visual representation 246c of some or all of a Web page of interest, related image 246d, and user input control 246f. For example, in the illustrated embodiment, the visual representation 246c is provided so that the user may identify values and/or locations of one or more types of information of interest, with a similar image 246d being illustrated in this example to further assist the user in identifying the information of interest, although in other embodiments the example image 246d may not be provided. As discussed in greater detail elsewhere, the visual representation 246c may be provided in various manners in various embodiments, including as an image, as an interactive Web page (e.g., as part of a frame or other sub-element within the task section 245), etc. After reviewing the visual representation 246c, the user may provide results of the performance in one or more manners, such as by using various user input controls provided for that purpose. In particular, in this example, the type of information of interest corresponds to the product weight attribute 258b of FIG. 2A, and one possibility for obtaining user input involves the user typing the value for that attribute into text box 246f (i.e., to type '12 ounces' or '12' in this example, as shown in FIG. 2A). The user could also interact with the visual representation 246c in one or more manners to identify the information of interest in some embodiments, whether in addition to or instead of using the text box 246f, such as by clicking on the visual display of the product weight attribute 258b in the visual representation 246c (as shown in FIG. 2A), by highlighting the area of the product weight attribute 258b and optionally surrounding text (e.g., the product ID 258a and/or the product size 258c) in the visual representation 246c, etc., as discussed in greater detail elsewhere. After performing the Web page information identification task, the user may submit the results of the performance or cancel the performance by selecting controls 248a or 248b, respectively.

Although FIG. 2B illustrates an example of a Web page information identification task that requests a task performer to identify information of interest from a visual representation of a Web page, Web page information identification tasks may be presented and performed in various other ways in various other embodiments. For example, in some embodiments, the automated website structure determination system may supply multiple possible values for the information of interest (e.g., 'productid1A001', '12', 'ounces', '8.1', '5.2', '1.1', etc., if the automated website structure determination system is able to determine that the product weight value is an alphanumeric value within the product details 258 section of the Web page), from which the task performer user may select at least one, such as by using selection boxes, text boxes, drop-down lists, radio buttons, etc. As another example, the automated website structure determination system may supply a likely or expected value of the information of interest that is automatically determined, with the task performer user being asked to confirm that the supplied value is correct or not. In addition, in some embodiments, the visual representation that is displayed to the human task performer user may be only a portion of the Web page, such as to correspond to the product details 258 section of the Web page if that section is automatically determined as containing the information of interest. Moreover, in other embodiments, the task provided may ask the human task performer user to identify multiple values for one or more indicated types of information of interest in one or more displayed visual representations of one or more Web pages. Furthermore, while not illustrated here, the user may be able to provide other types of results in some embodiments, such as to indicate a degree of certainty of the user or a degree of likelihood of the identified information (e.g., by selecting from an enumerated scale with multiple options). In addition, the human task performer user may be asked to supply information in multiple stages of the task, such as to first highlight a portion of the displayed visual representation, and then to select or verify particular text that is generated from optical character recognition processing of that highlighted portion. It will be appreciated that various other alternatives are available in displaying and obtaining information from a user, and that the details of the examples in FIGS. 2A and 2B are provided for illustrative purposes and are not intended to limit the described techniques.

In addition, in at least some embodiments, the automated website structure determination system may perform various types of processing of a visual representation to be reviewed by humans before that review occurs. For example, for visual representations that include image and/or video data, various types of image manipulation processing may be performed in at least some situations, such as one or more of the following: color correction or other color modification; brightening and other contrast changes; sharpening; cropping; noise removal; etc. Similar types of processing may be performed for audio data and other types of media data that may be included as part of or in place of a visual representation in at least some embodiments and situations. In addition, images and other media within a visual representation may be of various formats, including GIF, BMP, JPEG, RAW, PNG, PDF, SWF, SVG, MPEG, etc., and may be generated in various ways. In other embodiments, one or more visual representations may instead be provided to a user in a manner that is not part of a user interface, such as data sent to the user for display or other review in a manner selected by the user (e.g., on a selected device using a selected image viewer or other media player), by sending a URL to a user to enable the user to manually initiate a corresponding display in a Web browser or other program on the user's client device, etc. Furthermore, a visual representation may be manipulated in other manners in order to prepare it for human review in at least some embodiments, such as by making determinations and corresponding modifications with respect to the size or other characteristics of data within a visual representation, including to be of a size to correspond to a certain amount of subject matter (e.g., a certain screen area size or portion of a Web page), to correspond to a screen resolution that is expected for computing devices of the human users, etc.

In addition, determinations may be made regarding various other factors that affect Web page information identification tasks, such as the following: the number of Web page visual representations to be reviewed in each Web page information identification task; the number of distinct human users to independently perform each Web page information identification task (e.g., 1, 5, etc.); the threshold for determining when human-supplied information about a type of information of interest in a Web page's visual representation is sufficiently reliable to identify a corresponding structural location or element in an underlying representation of the Web page (e.g., based on a quantity of distinct human users who each identify the same information value in a particular visual representation, based on a quantity of different related Web pages in which the same structural location or element is identified as corresponding to a particular indicated type of information of interest based on supplied human input, etc.); the types of further use of the structural elements or locations that are determined to correspond to an indicated type of information of interest (e.g., to provide the determined structural elements or locations to other users for further review, such as experts or other higher-qualified users who have specialized capabilities for such further review); etc.

In addition, embodiments of the automated website structure determination system may perform various other actions in other embodiments. For example, in some embodiments, the automated website structure determination system may perform an automated analysis of some visual representations, such as before human review of those visual representations in order to assist the human review (e.g., by providing one or more possible candidates for the information of interest, to restrict the portion of the visual representation that is shown to a subset that is most likely to include the information of interest, etc.), and/or after human review of those visual representations to confirm or supplement the results of the human review. In addition, some embodiments of the automated website structure determination system may prioritize or otherwise select a subset of the available Web page visual representations for review in various ways, such as based on automated analysis of those visual representations, on those Web pages corresponding to a subset of the total Website that is most likely to be relevant to the information of interest (e.g., to product-specific Web pages from an online retailer rather than other Web pages from the online retailer that include other types of information), etc. In addition, while in some embodiments any human users are allowed to participate in the human review of the visual representations and are treated in a uniform manner with respect to such review, in other embodiments various information about the human users may be used in various ways (e.g., to restrict performance of some or all Web page information identification tasks to only certain human users, such as those having specified qualifications; to prioritize the review activities of some human users, such as to allow the human users with the highest qualifications and/or most relevant experience to review the tasks with the highest priority visual representations and/or to perform further review or confirmation for visual representations that have already been reviewed by other human users; to use information about particular human users when assessing results received from those human users, such as to give greater weight to information identifications if the corresponding human users are highly rated with respect to relevant experience, qualifications and/or diligence; etc.).

Figure 3:
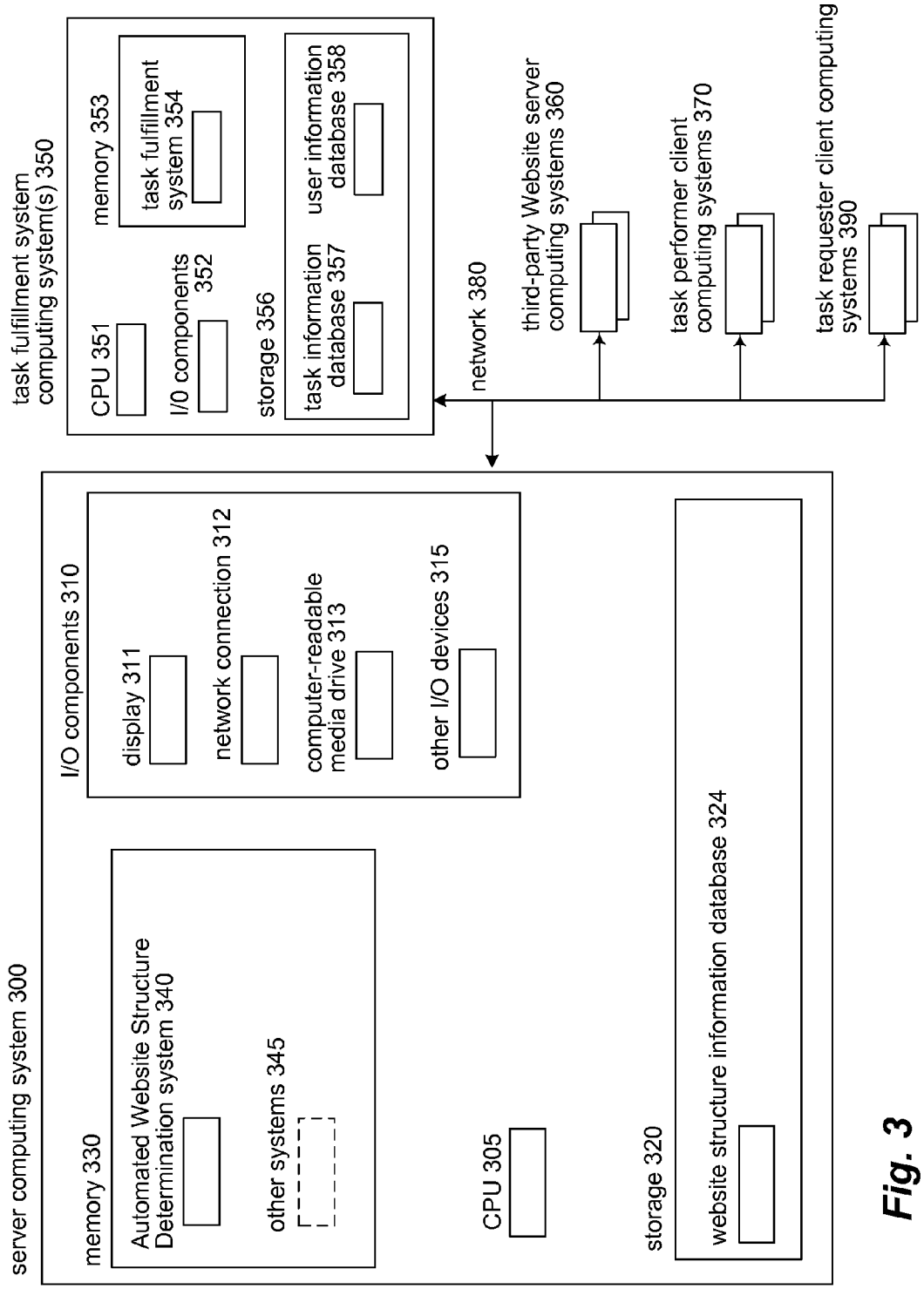
FIG. 3 is a block diagram illustrating an example computing system suitable for executing an embodiment of a system that facilitates automated determination of the structure of a Website.

FIG. 3 is a block diagram illustrating a computing system suitable for executing an embodiment of an automated website structure determination system that automatically determines the structure of multiple related Web pages based at least in part on human-supplied information. In particular, FIG. 3 illustrates a server computing system 300 suitable for executing an embodiment of an automated website structure determination system 340, as well as various task requester client computing systems 390, human task performer user client computing systems 370, and computing systems 360 used by external third-party entities to provide target Websites of interest. In addition, FIG. 3 illustrates a server computing system 350 suitable for executing an embodiment of a task fulfillment system 354, although in other embodiments the automated website structure determination system 340 and task fulfillment system 354 may be integrated together in a single system or otherwise provided by a single group of one or more server computing systems 300 (e.g., if one of the optional other systems 345 executing in memory 330 is instead an embodiment of a task fulfillment system). In the illustrated embodiment, the server computing system 300 includes one or more CPU processors 305, various I/O components 310, storage 320, and memory 330, and the I/O components include a display 311, a network connection 312, a computer-readable media drive 313, and other I/O devices 315 (e.g., a keyboard, mouse, speakers, etc.). The computing systems 350 each similarly include one or more CPU processors 351, various I/O components 352, storage 356, and memory 353, although particular I/O components are not illustrated in this example. The other computing systems 360, 370 and 390 may each similarly include some or all such hardware components, but those components are not illustrated in this example for the sake of brevity.

In this illustrated embodiment, the automated website structure determination system 340 is executing in the memory 330, and in at least some embodiments includes software instructions that when executed by the CPU 305 programs the server computing system 300 to perform some or all of the described techniques, such as when the automated website structure determination system 340 represents a software implementation of the Automated Website Structure Determination System 105 described with reference to FIG. 1. The system 340 may obtain information about a target Website of interest from an operator or other user (not shown) and optionally additional related information (e.g., indications of one or more types of information of interest for that target Website), and interacts with one or more computing systems 360 that provide that target Website over the network 380 using the network connection 312, such as to retrieve one or more Web pages of that target Website. The system 340 then generates one or more Web page information identification tasks that request human-supplied information to identify information of one or more indicated types of interest in visual representations of one or more of the Web pages, and supplies those generated tasks to the task fulfillment system 354, such as for storage in task information database 357. After the results of the human performance of the generated tasks are received, the system 340 performs additional automated operations to determine underlying structural elements or locations that correspond to the information of interest in underlying representations of the Web pages, and optionally retrieves additional information of the one or more indicated types from other Web pages of the target Website by using the determined underlying structural information. The system 340 may further store various information in this example in the website structure information database 324 on storage 320, such as one or more of downloaded Web pages of target Websites (e.g., the underlying textural representation, an optional separate structural representation, an optional visual representation, etc.), generated Web page information identification tasks, received results of human performance of Web page information identification tasks, automatically determined underlying structural information for information of interest of one or more indicated types in one or more Web pages, additional information of the one or more indicated types that is automatically retrieved from a target Website using determined underlying structural information, etc. While not illustrated here, the automated website structure determination system 340 may include multiple modules that each performs a subset of the functionality of the system 340, such as a first module that generates Web page information identification tasks, a second module that uses results of human performance of Web page information identification tasks to automatically analyze underlying representations of Web pages and determining corresponding structural elements or locations, a third module that uses determined corresponding structural elements or locations for at least some Web pages of a target Website to automatically retrieve additional information of interest from one or more of those Web pages, etc.

In this illustrated embodiment, the task fulfillment system 354 is executing in the memory 353, and in at least some embodiments includes software instructions that when executed by the CPU 351 programs the one or more computing systems 350 to facilitate performance of tasks, such as when the task fulfillment system 354 represents a software implementation of the task fulfillment system 100 described with reference to FIG. 1. While not illustrated here, the task fulfillment system 354 may include multiple modules that each performs a subset of the functionality of the system 354. As described in greater detail elsewhere, the task fulfillment system may provide various functionality to act as an intermediary to facilitate performance by task performer users of tasks supplied by task requesters. The task fulfillment system 354 may further access and use various task-related and user-related information on storage 356, such as in task information database 357 and user information database 358. The task information database 357 may, for example, be used to implement the task information data repository 130 and task performance results information data repository 140 described with reference to FIG. 1, and the user information database 358 may, for example, be used to implement the user information data repository 150 described with reference to FIG. 1.

Human task requester users may use, for example, application programs (not shown) executing on the task requester client computing systems 390 to communicate via the network 380 with the task fulfillment system 354, such as to submit tasks to be performed and obtain results of performance of such task by task performer users. In addition, human task performer users may utilize Web browsers or other programs (not shown) executing on the task performer client computing systems 370 to communicate via the network 380 with the task fulfillment system 354, such as to perform tasks and provide task performance results. The programs used by the task requester users and/or task performer users may, for example, include custom client applications that communicate via standard and/or proprietary protocols with the task fulfillment system 354 and/or some intermediary application (e.g., a Web server). In some embodiments, the task fulfillment system 354 may further provide an API that provides programmatic access to at least some of the functionality provided by the task fulfillment system 354.

It will be appreciated that computing systems 300, 350, 360, 370, and 390 are merely illustrative and are not intended to limit the scope of embodiments of the present disclosure. The task fulfillment system 354 and/or the automated website structure determination system 340 may instead each be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware and/or firmware that can interact in the described manners, optionally when programmed or otherwise configured with particular software, including (without limitation) desktop or other computers, network devices, PDAs, cell phones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task fulfillment system 354 and/or automated website structure determination system 340 may in some embodiments be provided via various modules, as noted above.

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software systems and/or modules may execute in memory on another device and communicate with the illustrated computing systems via inter-computer communication. Furthermore, in some embodiments, some or all of the systems and/or modules may be implemented or provided in other manners, such as at least partially using firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIG. 5 is a flow diagram of an example embodiment of an Automated Website Structure Determination routine 500. The routine may be provided by, for example, execution of an embodiment of the Automated Website Structure Determination system 105 of FIG. 1 and/or the automated website structure determination system 340 of FIG. 3, such as to automatically determine the structure of multiple related Web pages based at least in part on human-supplied information. As part of the execution of the illustrated embodiment of the routine 500, the routine interacts with an embodiment of a task fulfillment system to obtain performance of Web page information identification tasks. Alternatively, in other embodiments, a task fulfillment system may provide functionality of an automated website structure determination system, and if so the routine 500 may be provided by execution of a portion of the task fulfillment system 100 of FIG. 1 and/or of the task fulfillment system 354 of FIG. 3, or instead an automated website structure determination system may directly interact with human users to perform generated Web page information identification tasks without using a task fulfillment system for such task performance. In addition, while the illustrated embodiment of the routine determines structural information with respect to at least some Web pages of a target Website, in other embodiments the techniques may instead be used to analyze multiple related Web pages that share a common structure as at least a portion of the structure of those Web pages, even if those Web pages are not provided by a single Website.

The illustrated embodiment of the routine 500 begins at block 505, where information and/or a request is received related to a target Website of interest, including to optionally receive various types of overview information to use as part of the analysis of the target Website, such as from a user or other entity at whose request the target Website analysis is being performed. The information received may have various forms in various embodiments, such as to initiate a new analysis of a target Website and/or to update an ongoing analysis of a target Website. The received information may in various situations include overview instructions or other information related to the analysis of the target Website, such as, for example, one or more indicated types of information of interest, a subset of one or more particular Web pages at the target Website that include the one or more indicated types of information of interest, a template or definition of the Web page information identification tasks to be performed for the target Website, one or more particular Web pages at the target Website to use for the generated Web page information identification tasks, information about an overall monetary budget to use for the performance of the Web page information identification tasks or of individual fees to pay human task performer users for some or all of the Web page information identification tasks, any qualifications that are preferred or required for human users who perform the Web page information identification tasks, one or more minimum thresholds to assess when a determined structural element or other structural location corresponding to an indicated type of information of interest is sufficiently reliable, whether multiple levels of review of one or more visual representations of displayed Web pages are to be performed and if so in what manner, whether a human review is to be performed of an initial determination of a structural element or other structural location corresponding to an indicated type of information of interest and if so in what manner, etc. In other embodiments, some or all of those types of overview information may instead be automatically determined by the routine based in part on other information about the analysis effort, or instead in a default manner.

In the example embodiment, the routine then continues to block 510 to determine whether the information received in block 505 indicates a new target Website to be analyzed. If so, the routine continues to block 515 to retrieve at least some of the Web pages of the target Website for use in generating one or more Web page information identification tasks, unless such Web pages are supplied as part of the information received in block 505. The routine then continues to block 520 to generate one or more Web page information identification tasks that each involves identifying information of one or more indicated types of interest on at least one of the retrieved Web pages, and then submits the generated tasks to a remote task fulfillment system for performance. The generation of the tasks may be based on corresponding overview information received in block 505, or instead using a default task template. The Web page information identification task previously discussed with respect to FIGS. 2B and 2A provides one illustrative example of such a generated task. In block 525, the results are then received of human performance of at least one of the submitted tasks, such as after a period of time has passed to allow for the human performance (e.g., after a matter of seconds, minutes, hours, days, etc., based on the speed at which the human task performer users of the task fulfillment system perform the submitted tasks).

After block 525, the routine continues to block 530 to analyze the underlying structural representations of the one or more Web pages whose visual representations were reviewed in the received task performance results, in order to determine particular structural elements or other structural locations that correspond to the information of interest. The routine further determines in block 530 if sufficient human-supplied information has been received for a minimum level of reliability in the determination of the structural locations of interest, such as based on a specified minimum quantity of one or more humans who provide the same information for a given submitted task, based on a specified minimum quantity of one or more different Web pages whose analysis results in the same determined location for a given type of information of interest, etc. In some embodiments, different groups of Web pages of a target Website may store different types of information, and/or may store a given type of information of interest in different structural locations, and if so the automated analysis of block 530 may further attempt to identify the groups of Web pages that share common structure corresponding to the information of interest—such a further automated analysis may be performed in various manners, such as by using data mining techniques to identify patterns of related structural locations for different types of Web pages, by using information about the hierarchical structure or other structure of the target Website, by obtaining and using supplemental information from an operator or other user (e.g., a user who supplied information received in block 505), etc. If it is then determined in block 535 that sufficient information is not yet available, the routine returns to block 520 in the illustrated embodiment to perform additional analysis of one or more Web pages of the target Website (e.g., additional analysis of different Web pages that have not yet been analyzed, additional analysis of the same Web pages, etc.).

If it is instead determined in block 535 that sufficient information is available to reliably determine the one or more structural locations corresponding to the indicated information of interest of one or more indicated types for at least some of the Web pages of the target Website, the routine continues to block 540 to automatically obtain additional information of interest of those indicated types from one or more of those Web pages of the target Website, such as by automatically retrieving those Web pages, using the determined structural locations to identify the information of interest that is stored in those Web pages, extracting the identified information of interest, and optionally storing that extracted information and/or providing that extracted information to one or more designated recipients (e.g., a user who supplied information received in block 505). In some embodiments, the routine may further generate one or more additional tasks to verify that the automated retrieval of additional information was performed correctly, and if so generates and submits such additional tasks in block 545, and uses the received results to confirm that the automated retrieval of additional information was performed correctly. While not illustrated here, if such received results in block 545 do not verify that the automated retrieval of additional information was performed correctly, the routine may take other corrective actions, such as to return to block 520 to attempt to perform further analysis of Web pages of the target Website, to discard the determined structural location information of block 530 and/or the retrieved additional information of block 540, to abandon the attempt to automatically determine the structure of the target Website, etc.

In the illustrated embodiment, after block 545 confirms the additional information, or instead if the activities of block 545 are not performed, the routine continues to block 550 to optionally perform one or more related additional activities, including one or more of storing information about the determined structural locations of the target Website for later use, of scheduling later activities to obtain additional information at one or more future times in a manner similar to that of block 540 (e.g., from different Web pages of the target Website from which information has not yet been retrieved; from one or more Web pages of the target Website from which information has already been retrieved, such as to track whether the information of interest changes over time or at particular future times of interest; etc.), of optionally using the obtained additional information for one or more additional purposes, etc.

If it was instead determined in block 510 that the received request or information is not related to a new analysis of a target Website, the routine continues instead to block 590 to perform one or more other indicated operations as appropriate, such as to perform previously scheduled retrievals of information from one or more Web pages of a target Website using previously determined structural information (e.g., as previously scheduled in block 550), to receive and respond to requests for information that was previously determined, identified and/or retrieved, etc.

After blocks 550 or 590, the routine continues to block 595 to determine whether to continue, such as until an explicit indication to terminate is received. If so, the routine returns to block 505, and if not continues to block 599 and ends.

Figure 4A:
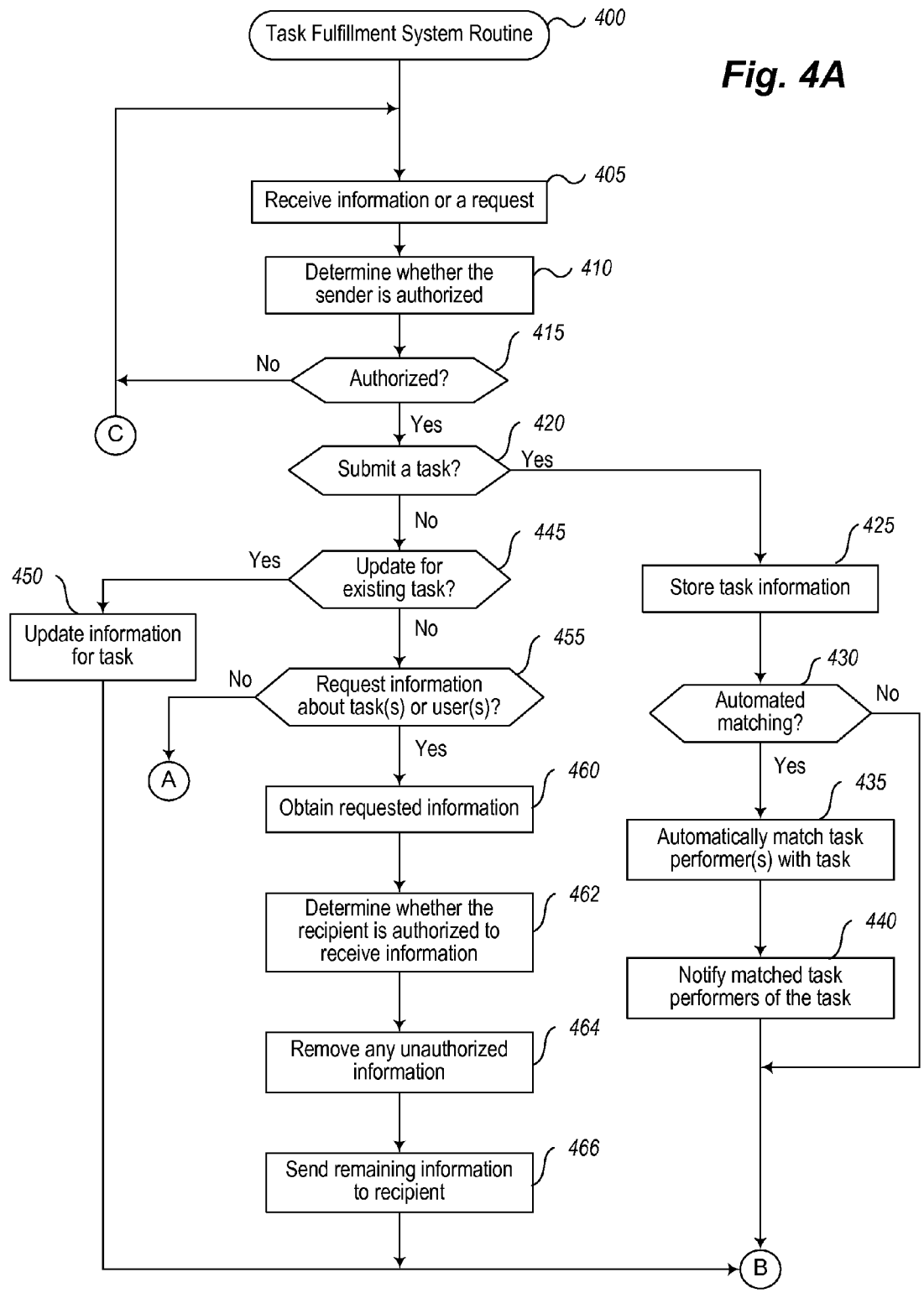
FIGS. 4A and 4B are a flow diagram of an example embodiment of a Task Fulfillment System routine.
Figure 4B:
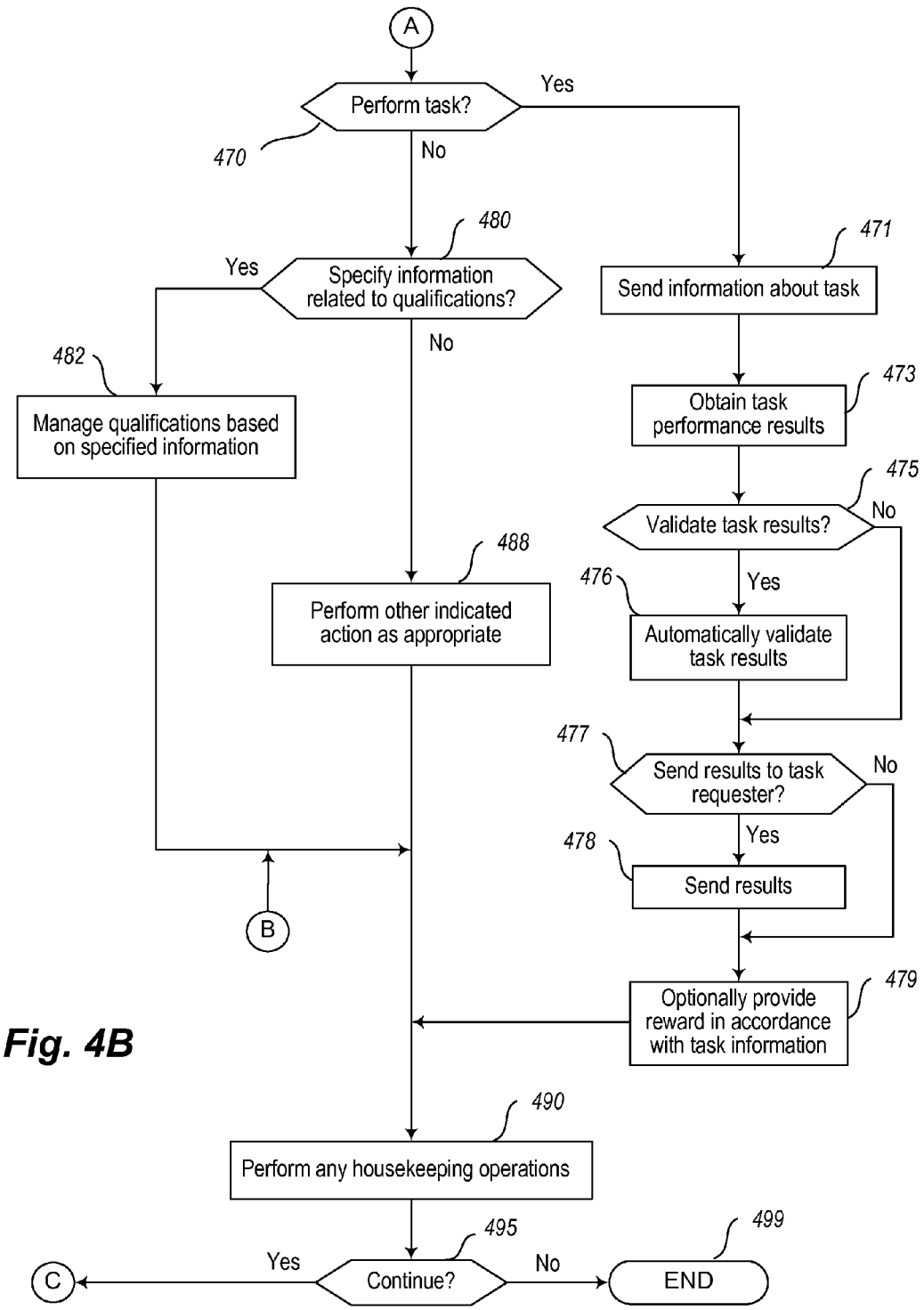

FIGS. 4A and 4B are a flow diagram of an example embodiment of a Task Fulfillment System routine 400. The routine may be provided by, for example, execution of an embodiment of the task fulfillment system 100 of FIG. 1 and/or the task fulfillment system 354 of FIG. 3, such as to in this illustrated embodiment facilitate performance of tasks by interacting with task requesters and task performer users as appropriate.

In this illustrated embodiment, the routine begins at block 405, where an indication is received of information or a request, and in block 410 determines whether the sender of the information or request is authorized to perform requests of that type or provide information of that type (e.g., based on prior registration of the users with the task fulfillment system, and/or on other previously defined access controls for specific users or types of users). If the routine identifies the sender as authorized in block 415, or if an authorization determination is not performed, the routine continues to block 420 to determine whether the received indication is a request to submit one or more tasks, such as from an embodiment of the automated website structure determination system to submit one or more Web page information identification tasks, or from another task requester to submit another type of task. If so, the routine continues to block 425 to store task information received in block 405, including any specified task performance criteria related to task performance, information about any associated rewards for performance of the task, any associated information to be analyzed or manipulated as part of the task, etc. The routine then continues to block 430 to determine whether to perform automated matching to identify task performer users who are appropriate to perform the task, such as based on the type of task submitted (e.g., a type of Web page information identification task) and/or an explicit request by the submitter of the task, although in other embodiments such automated matching functionality may not be provided. In the illustrated embodiment, if automated matching is to be performed, the routine continues to block 435 to automatically match one or more task performer users with the task by, for example, identifying one or more task performer users whose qualifications satisfy any qualification criteria for the new task. The routine then notifies those identified task performer users of the task in an appropriate manner in block 440 (e.g., based on previously specified user preferences for those task performer users). After block 440, or if it is instead determined in block 430 that automated matching is not to be performed, the routine continues to block 490.

If it is instead determined in block 420 that the received indication is not to submit a task, the routine continues instead to block 445 to determine whether a request is received to perform an update for an existing task, and if so continues to block 450 to perform the update as appropriate. Such updates may take a variety of forms, such as to modify information about or delete a pending task that has not been performed; to perform an indicated activity related to a task (e.g., to cause a reward to be provided to a task performer user after the task requester has reviewed and accepted task performance results from that task performer user); to add, modify, or remove performance criteria associated with an existing task; to add or modify task release criteria associated with a task that has not yet been released (e.g., a task that is part of a group having at least some tasks of the group that have not yet been released); to update a group of Web page information identification tasks with status information regarding the overall effort to determine corresponding underlying structure for multiple related Web pages to which that group of tasks belongs; etc.

If it is instead determined in block 445 that the received indication is not to update an existing task, the routine continues to block 455 to determine whether the received indication is a request for information about one or more tasks and/or one or more users, such as for a search or browse request. If so, the routine continues to block 460 to identify and obtain the requested information, and then continues to block 462 to determine whether the indicated recipient of the information is authorized to receive all of the obtained information, such as based on access controls associated with any aspects or elements of the obtained information (although in other embodiments the access determination may be made before or as part of the obtaining of the information). In block 464, the routine then removes information for which the recipient is not authorized, if any, and in block 466 sends any remaining information to the recipient. In some embodiments, indications may be provided to the recipient of any removed information for which they were not authorized, while in other embodiments such indications may not be provided. After blocks 450 or 466, the routine continues to block 490.

If it is instead determined in block 455 that the received indication is not a request for information about tasks or users, the routine continues instead to block 470 to determine whether the received indication is a request from a task performer user to perform an indicated task. If so, the routine continues to block 471 to retrieve and provide information about the task to the task performer user in an appropriate manner (e.g., in a manner specified for the task), and in block 473 obtains results of performance of the task by the task performer user. In block 475, the routine then determines whether to automatically validate the task results, such as based on whether a task requester has specified that the results for the task are to be validated. If so, the routine continues to block 476 to automatically validate task results. Validating task results may be performed in various ways, such as type checking the task results (e.g., by determining whether the task result comprises an integer or other type of data), range checking the task results (e.g., by determining whether a task result is within a particular value range), etc.

After block 476, or if it is instead determined in block 475 not to validate the task results, the routine continues to block 477. In block 477, the routine then determines whether to immediately send the task results to the task requester, such as based on information associated with the task, the outcome of the automated validation of block 476, and/or user preferences for the task requester. If so, the routine continues to block 478 to send the results. After block 478, or if it is instead determined in block 477 not to send the results to the task requester at this time, the routine continues to block 479 to optionally provide any reward associated with the task to the task performer user, such as in accordance with the task information and/or the outcome of the automated validation of block 476. After block 479, the routine continues to block 490.

While the illustrated embodiment indicates a synchronous flow in which the routine waits for and obtains task performance results in block 473 after sending the task information in block 471, in other embodiments the routine may be structured in other manners, such as to continue with other processing while waiting for such task results (if any) to be received. In addition, in some situations, task performer users may not provide task results for a task after they accept an assignment to perform the task, which may be indicated to the routine in an explicit message from the task performer user that the task performer user is abandoning or withdrawing from task performance, or instead by not receiving task results within a specified period of time—if so, the routine may continue to handle other task-related requests and information. In addition, while not illustrated here, in other embodiments various types of notifications may be sent to task requesters related to their submitted tasks, such as when a task is assigned to a task performer user for performance and/or when an assigned task is withdrawn from a task performer user who has not completed the performance.

If it is instead determined in block 470 that the received indication is not to perform a task, the routine continues instead to block 480 to determine whether the received indication is to specify information related to user qualifications, and if so continues to block 482 to manage qualifications based on the specified information. Managing qualifications may include, for example, defining a new type of qualification for use with the system, specifying a particular qualification for a particular user, removing a particular qualification from a user, removing a particular qualification from the system, etc.

If it is instead determined in 480 that the received indication is not to specify qualification-related information, the routine continues instead to block 488 to perform another indicated operation as appropriate, such as to receive and store various types of user information (e.g., information related to a user's identity or attributes, information related to an account of a user with the system, etc.), information related to specifying access controls for information and/or functionality, administrative requests related to system operations, requests for information related to monitoring performance of tasks or other operations of the system, an indication of a task performer user withdrawing from or abandoning an assignment to perform a task, etc.

After blocks 440, 450, 466, 479, 482, or 488, the routine continues to block 490 to optionally perform any additional housekeeping operations, such as to store information that is generated or received during execution of the routine, to generate summary aggregate information for the system related to tasks and users, to take appropriate actions when events do not occur within specified periods of time (e.g., to withdraw assigned tasks from task performer users who do not timely perform the tasks, or to provide rewards to task performer users for tasks that they have performed when task requesters do not timely reject the task results provided by the task performer users), etc. After block 490, the routine continues to block 495 to determine whether to continue, such as until an explicit indication to terminate is received. If so, or if it is determined in block 415 that the sender is not authorized, the routine returns to block 405, and if not continues to block 499 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that the data structures discussed above may be structured in different manners, including with respect to database data structures and Web page data structures, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method, comprising:
retrieving, by one or more programmed computing systems, a Web page of a target Website of an online merchant, the retrieved Web page including information about one of a plurality of products available from the online merchant and having an associated textual document that represents a structure of the Web page and having a distinct visual representation when displayed, wherein the plurality of products share one or more common attributes and have differing values for at least one of the common attributes;
generating, by the one or more programmed computing systems, a task for one or more humans to identify information of an indicated type in the visual representation of the retrieved Web page, wherein the information of the indicated type includes a value for the one product for the at least one common attribute;

submitting the generated task to a task fulfillment system for human performance, and receiving, from the task fulfillment system, results of the human performance of the generated task, the received results including the identified information of the indicated type;

mapping, by the one or more programmed computing systems, the identified information from the received results to a corresponding location in the textual document, the corresponding location identifying a structural element within the textual document at which the identified information is stored;

retrieving, by the one or more programmed computing systems, information of the indicated type from other Web pages of the target Website that are distinct from the retrieved Web page by using the identified structural element to retrieve information from associated textual documents that represent structure of the other Web pages; and providing one or more indications of the retrieved information.

2. The method of claim 1 wherein the associated textual document includes a DOM ("Document Object Model") representation, and wherein the identified structural element is a DOM object.

3. The method of claim 1 wherein the associated textual document is an HTML ("HyperText Markup Language") document, and wherein the identified structural element is an HTML element.

4. The method of claim 1 wherein the at least one common attribute includes at least one of a group of attributes including a product weight, a product size, a product color, a current availability of a product, a product price, a product category of a product, an image of a product, or a textual description of a product, and wherein the method further comprises generating and submitting multiple additional tasks for human performance to obtain additional values of the at least one common attribute for multiple additional products of the plurality of products.

5. The method of claim 1 wherein the visual representation includes at least a portion of a rendered Web page with user-selectable controls, wherein the identified information included in the received results is based at least in part on selection by a human of one of the user-selectable controls, and wherein the mapping of the identified information from the received results includes identifying a structural element in the textual document that corresponds to the one user-selectable control.

6. The method of claim 1 wherein the visual representation is a static image, and wherein the identified information included in the received results is based at least in part on selection by a human of one or more points in the static image where the identified information is displayed.

7. The method of claim 6 wherein the selection by the human of the one or more points in the static image is based on the human specifying an area of the static image that includes the one or more points, the specified area including displayed text corresponding to the identified information, and wherein the identified information included in the received results is further based on an automated optical character recognition analysis of the displayed text in the specified area of the static image.

8. The method of claim 7 wherein the specified area further includes additional displayed text that is not part of the identified information of the indicated type, wherein the received results further include the additional displayed text, and wherein the mapping of the identified information from the received results includes identifying a location of the additional displayed text in the associated textual document and using the identified location to assist in the mapping of the identified information to the corresponding location in the textual document.

9. The method of claim 1 wherein the identified information included in the received results is based at least in part on a human entering text corresponding to the identified information, and wherein the mapping of the identified information includes searching the associated textual document for the entered text.

10. The method of claim 1 further comprising, before the generating of the task:

retrieving, by the one or more programmed computing systems, multiple additional Web pages of the target Website;

assessing the retrieved multiple additional Web pages to identify a subset of two or more of the retrieved multiple additional Web pages having a common structure that includes information of the indicated type, and wherein the retrieved Web page having the associated textual document is selected for use with the generated task based at least in part on sharing the common structure with the identified two or more additional Web pages.

11. The method of claim 1 wherein the one or more programmed computing systems are part of an automated website structure determination system, and wherein the method further comprises, under control of the task fulfillment system:

receiving a plurality of tasks supplied by task requesters for performance by a plurality of human task performer users, wherein the task requesters include the automated website structure determination system, and wherein the plurality of supplied tasks include the submitted generated task, the submitted generated task being a fee-based task that has an associated fee to be paid to one or more human task performer users for successful performance of the submitted generated task;

coordinating performance of the plurality of tasks by the plurality of human task performer users, the coordinating of the performance including obtaining the received results from performance of the submitted generated task by one or more of the plurality of human task performer users;

sending the obtained received results to the automated website structure determination system; and facilitating providing of compensation to the one or more human task performer users to reflect the associated fees for the submitted generated task.

12. The method of claim 1 wherein the one or more programmed computing systems are part of an automated website structure determination system that is unaffiliated with the task fulfillment system.

13. The method of claim 1 wherein the one or more programmed computing systems are part of the task fulfillment system.

14. A non-transitory computer-readable medium having stored contents that configure a computing system to perform a method, the method comprising:

generating, by the configured computing system, a task for human performance that includes request for one or more humans to identify information of one or more indicated types in a visual representation of at least one Web page from a plurality of Web pages having a common structure, wherein the visual representation of at least one Web page is generated from display of the at least one Web page, and wherein the information of the one or more indicated types includes a value for an indicated attribute of a product available from an online merchant;

after making the generated task available for performance by a group of humans, receiving, by the configured computing system, results of the human performance of the generated task, the received results including the identified information of the one or more indicated types in the visual representation of the at least one Web page;

mapping, by the configured computing system, the identified information from the received results to one or more identified corresponding locations in one or more structural representations of the at least one Web page, the one or more structural representations being distinct from the visual representation of the at least one Web page; and providing one or more indications of the one or more identified corresponding locations in the one or more structural representations.

15. The non-transitory computer-readable medium of claim 14 wherein the method further comprises, after the mapping of the identified information from the received results to the one or more identified corresponding locations in the one or more structural representations:

retrieving, by the configured computing system, information of the one or more indicated types from other of the plurality of Web pages that are distinct from the at least one Web page, wherein the other Web pages include information about additional products available from the online merchant that include the indicated attribute, and wherein the automatic includes using the one or more identified corresponding locations to retrieve information from structural representations of the other Web pages; and providing one or more indications of the automatically retrieved information.

16. The non-transitory computer-readable medium of claim 14 wherein the plurality of Web pages are part of a target Website of interest provided by the online merchant and include information about multiple products available from the online merchant, and wherein the one or more structural representations of the at least one Web pages include a textual document associated with each of the at least one Web pages to represent a structure of that Web page.

17. The non-transitory computer-readable medium of claim 14 wherein the group of humans are human task performer users associated with a task fulfillment system, wherein the configured computing system is part of an automated website structure determination system, and wherein the stored contents are software instructions that when executed, program the configured computing system to perform the method.

18. A computing system comprising:
one or more processors; and
a memory storing instructions that, when executed by at least one of the one or more processors, configure the computing system to determine information about structural locations within multiple documents of a target Website by:
generating one or more tasks for human performance, the generated tasks including a request for one or more humans to identify information of one or more indicated types in a visual representation of at least one document from the multiple documents, wherein the multiple documents of the target Website include information about a plurality of products sharing a common attribute, and wherein the information of the one or more indicated types includes a value for the common attribute of one of the plurality of products;

making the generated one or more tasks available for performance by humans;

receiving results of the human performance of the generated one or more tasks, the received results including the identified information of the one or more indicated types in the visual representation of the at least one document;

mapping the identified information from the received results to one or more identified corresponding locations in one or more structural representations of the at least one document, the one or more structural representations being distinct from the visual representation of the at least one displayed document;

retrieving information of the one or more indicated types from additional documents of the multiple documents, the retrieving including using the one or more identified corresponding locations to retrieve information from structural representations of the additional documents; and providing one or more indications of the retrieved information.

19. The computing system of claim 18 wherein the multiple documents include multiple Web pages that are from an online merchant operating the target Website and that each includes information about at least one of the plurality of products that is available from the online merchant, and wherein the generated one or more tasks include multiple tasks that are each specific to one of the multiple Web pages.

20. The computing system of claim 18 wherein the configured computing system is part of an automated website structure determination system or a task fulfillment system, and wherein the humans to which the generated tasks are made available for performance are human task performer users associated with the task fulfillment system.

21. The computing system of claim 18 wherein the plurality of products have differing values for the common attribute, and wherein each of the multiple documents includes a value for the common attribute for at least one of the plurality of products.

22. The computing system of claim 21 wherein the common attribute is at least one of a group of attributes including a product weight, a product size, a product color, a current availability of a product, a product price, a product category of a product, an image of a product, or a textual description of a product.

23. The computing system of claim 21 wherein the stored contents further configure the computing system to generate and submit multiple additional tasks for human performance to obtain additional values of one or more additional attributes for multiple products of the plurality of products.

24. The non-transitory computer-readable medium of claim 14 wherein the product is one of a plurality of products that share a common attribute and have differing values for the common attributes, and wherein the indicated attribute is the common attribute.

25. The non-transitory computer-readable medium of claim 24 wherein the indicated attribute is at least one of a group of attributes including a product weight, a product size, a product color, a current availability of a product, a product price, a product category of a product, an image of a product, or a textual description of a product.

26. The non-transitory computer-readable medium of claim 24 wherein the method further comprises generating and submitting multiple additional tasks for human performance to obtain additional values of one or more additional attributes for multiple products of the plurality of products.

* * * * *

UNITED STATES PATENT AND TRADEMARK OFFICE
CERTIFICATE OF CORRECTION

| | | |
|---|---|---|
| PATENT NO. | : 8,850,308 B1 | Page 1 of 1 |
| APPLICATION NO. | : 13/046596 | |
| DATED | : September 30, 2014 | |
| INVENTOR(S) | : Jason Roselander | |

It is certified that error appears in the above-identified patent and that said Letters Patent is hereby corrected as shown below:

In the Claims

Column 24, Line 65:
"human performance that includes request for one or" should read, --human performance that includes a request for one or--.

Column 25, Line 54:
"the stored contents are software instructions that when" should read, --the stored contents are software instructions that, when--.

Signed and Sealed this
Tenth Day of February, 2015

Michelle K. Lee
*Deputy Director of the United States Patent and Trademark Office*